(12) United States Patent
Grimm

(10) Patent No.: US 8,747,100 B2
(45) Date of Patent: Jun. 10, 2014

(54) MULTIPLE-COMPONENT INJECTION MOLD ASSEMBLY AND METHOD

(75) Inventor: Tod M. Grimm, Phoenix, AZ (US)

(73) Assignee: Tech Mold, Inc., Tempe, AZ (US)

( * ) Notice: Subject to any disclaimer, the term of this patent is extended or adjusted under 35 U.S.C. 154(b) by 289 days.

(21) Appl. No.: 13/362,919

(22) Filed: Jan. 31, 2012

(65) Prior Publication Data

US 2013/0193613 A1    Aug. 1, 2013

(51) Int. Cl.
*B29C 45/04* (2006.01)

(52) U.S. Cl.
USPC .................. 425/577; 425/588; 264/328.7

(58) Field of Classification Search
USPC ................. 425/577, 588; 264/328.7
See application file for complete search history.

(56) References Cited

U.S. PATENT DOCUMENTS

| | | | |
|---|---|---|---|
| 3,832,110 A | 8/1974 | Hehl | |
| 5,837,301 A | 11/1998 | Arnott et al. | |
| 6,447,280 B1 | 9/2002 | Grimm | |
| 6,790,027 B1 | 9/2004 | Callen et al. | |
| 7,081,179 B2 | 7/2006 | Hartlmeier et al. | |
| 7,128,553 B2 | 10/2006 | Shakal | |
| 7,320,591 B2 | 1/2008 | Gram | |
| 7,465,166 B2 | 12/2008 | Manda | |
| 7,998,390 B2 | 8/2011 | Olaru et al. | |
| 2005/0140053 A1* | 6/2005 | Lai et al. | 264/255 |
| 2007/0194494 A1 | 8/2007 | Hartlmeier | |
| 2011/0316196 A1* | 12/2011 | Altonen et al. | 264/328.7 |

* cited by examiner

*Primary Examiner* — James Sanders
(74) *Attorney, Agent, or Firm* — Thomas W. Galvani; Thomas W. Galvani P.C.

(57) ABSTRACT

An injection mold assembly for manufacturing multiple-component articles includes opposed first and second mold halves and mold cores carried by the first mold half. Each of the mold cores is mounted for rotation between a first position and a second position about an axis of rotation. The mold halves are mounted for movement in reciprocal directions along an axis of reciprocation between an open position and a closed position forming molding cavities between the mold cores and the second mold halves. The axes of rotation of the mold cores are different from one another.

13 Claims, 16 Drawing Sheets

MULTIPLE-COMPONENT INJECTION
MOLD ASSEMBLY AND METHOD

FIELD OF THE INVENTION

The present invention relates generally to injection molds, and more particularly to multiple-component injection mold systems and methods.

BACKGROUND OF THE INVENTION

Multiple-component injection molding is a manufacturing process for injecting two or more molten materials into a mold to form multiple-component articles. In the past, the majority of multiple-component injection molding machines have used a mold which incorporates a rotatable mold half that first molds partially-complete articles held on one side of the mold half in a first molding position and then moves them into a second molding position on the other side of the mold half for over-molding. These mold halves are usually quite heavy and require a significant amount of time and applied power to rotate due to their weight. Moreover, in these multiple-component injection molds in which two materials are injected into a mold, either simultaneously or at different times, the flow of each material into the mold produces its own distinct force on one side or the other of the mold and the molding machine. These forces are generally different, and the difference in forces causes the mold to torque and material to flash out of the mold cavities. This results in defectively-formed articles. Furthermore, the stress of repeated injections and repeated torquing eventually causes the mold, and possibly the molding machine, to fail, requiring expensive replacement of the mold or machine.

SUMMARY OF THE INVENTION

In a mold assembly according to the principles of the invention, a first mold half is mounted for reciprocal movement toward and away from a second mold half to close and open the mold assembly, respectively. Mold cores are carried by and distributed across the first mold half and are each individually rotatable about respective axes between first positions for receiving injections of a first material and second positions for receiving injections of a second material. In this way, injections of the first material are distributed across the mold half, and injections of the second material are also distributed across the mold half, so that the forces created during the injections create a net zero torque on the mold half. The mold cores carry collars which rotate together with the mold cores and reciprocate to shear newly-formed complete articles from the mold cores.

BRIEF DESCRIPTION OF THE DRAWINGS

Referring to the drawings.

DETAILED DESCRIPTION

Figure 1:
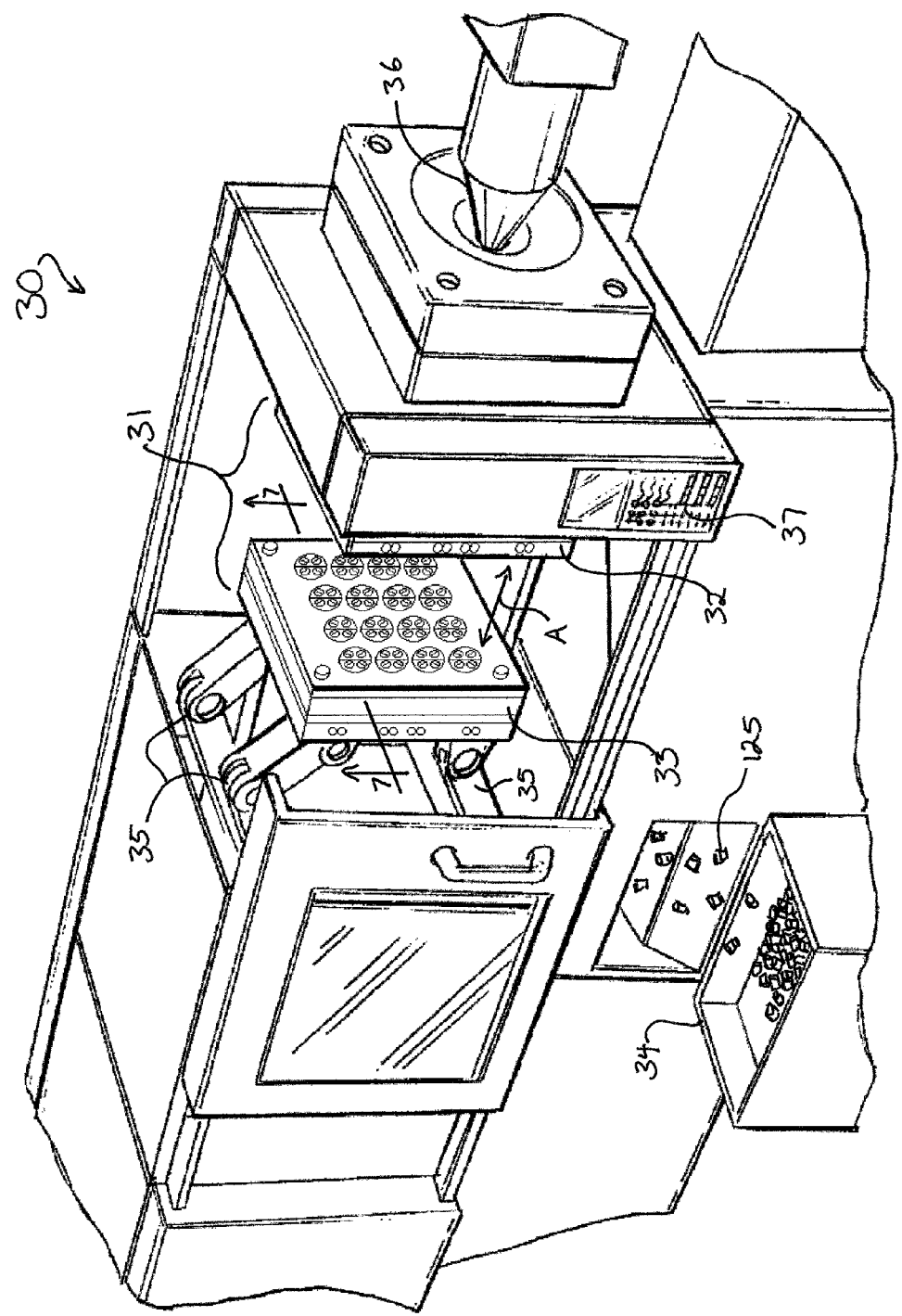
FIG. 1 is a perspective view of a mold assembly constructed in accordance with the principles of the invention as it would appear arranged in an injection molding machine and ready for use.

Reference now is made to the drawings, in which the same reference numbers are used throughout the different figures to designate the same components. FIG. 1 shows an injection molding machine 30 typical of that used for injection molding. The molding machine 30 includes a housing with a door that opens and closes an interior of the molding machine 30. Molded complete articles 125 are formed in a multiple-component injection mold assembly 31 carried in the interior of the molding machine 30 and are released into a collection bin 34. The mold assembly 31 includes opposed mold halves 32 and 33. Mold half 32 is secured in position within the molding machine 30 and is considered a fixed mold half 32. Mold half 33 is mounted to scissor arms 35 for reciprocal movement toward and away from the fixed mold half 32 along the double-arrowed line A in FIG. 1 to close and open the mold assembly 31, respectively. The mold half 33 is considered a moveable mold half 33. During operation, an injection nozzle 36 supplies plasticized or molten materials to the molding machine 30 and to the mold assembly 31 for molding articles. A computer or control panel 37 controls the movement of the moveable mold half 33 and its constituent parts, the application of molten materials through the injection nozzle 36, and other operational functions of the molding machine 30 as is typical.

Figure 2:
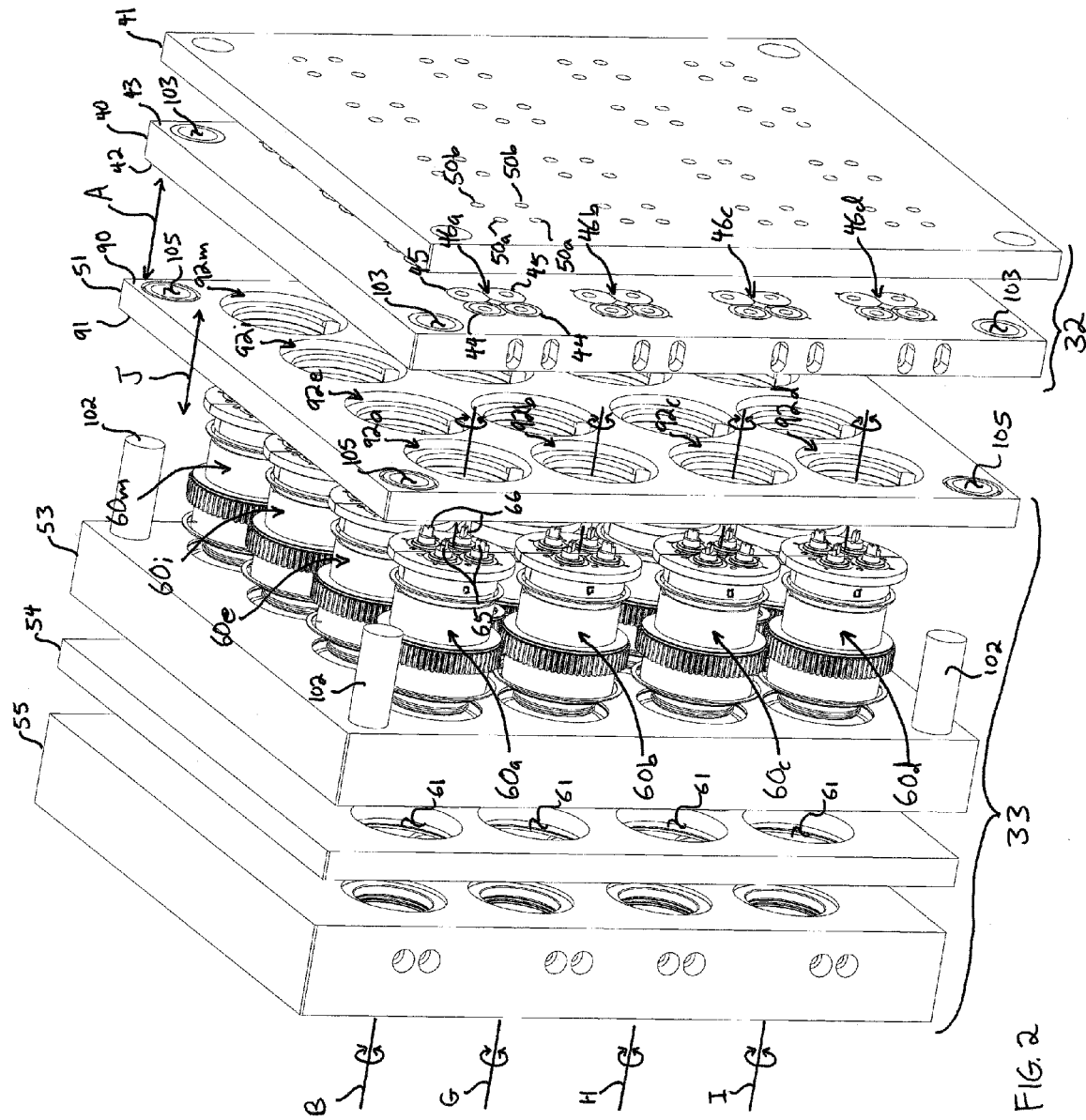
FIG. 2 is a partially-exploded perspective view of the mold assembly of FIG. 1 illustrating a fixed mold half, a moveable mold half, and mold core assemblies carried in the moveable mold half.
Figure 3:
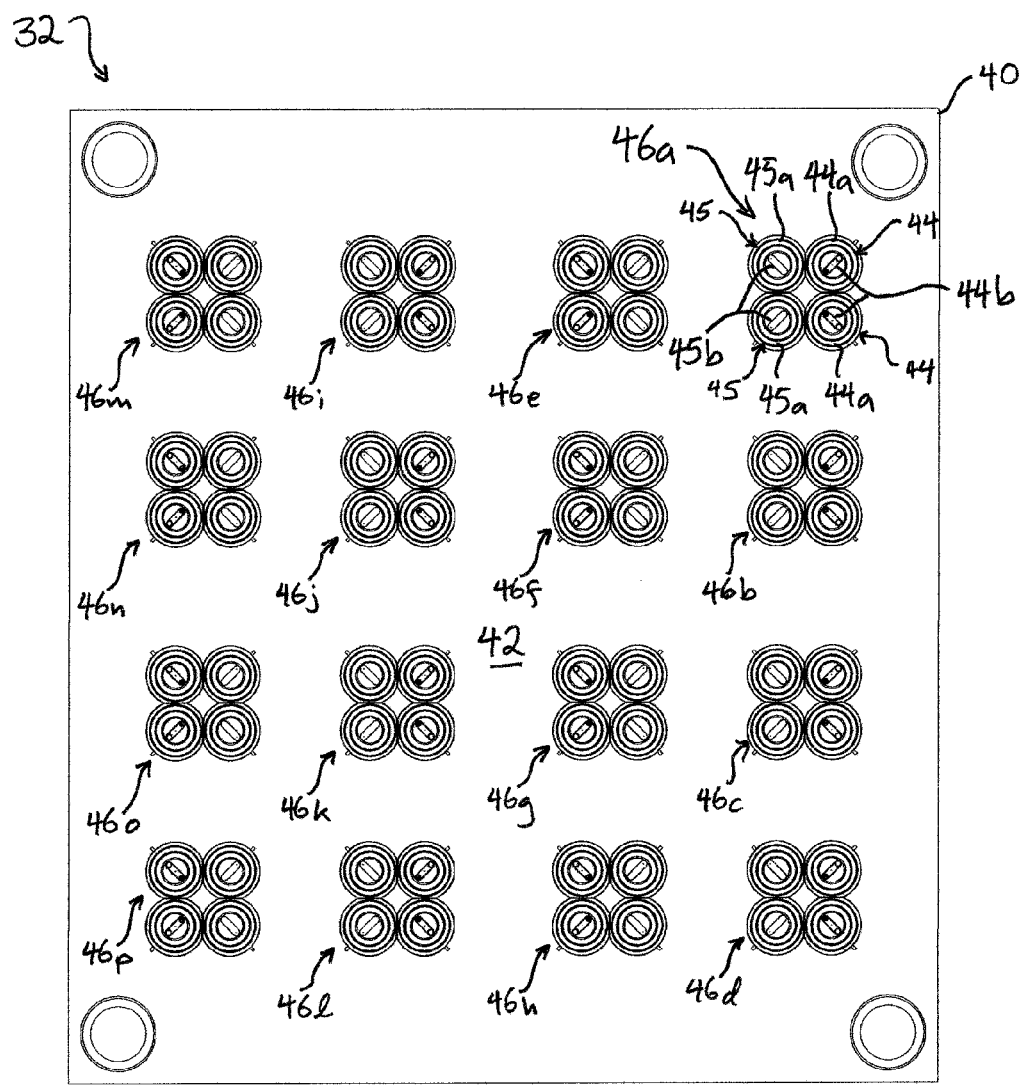
FIG. 3 is a front view of the inner face of the fixed mold half of the mold assembly of FIG. 1.
Figure 7:
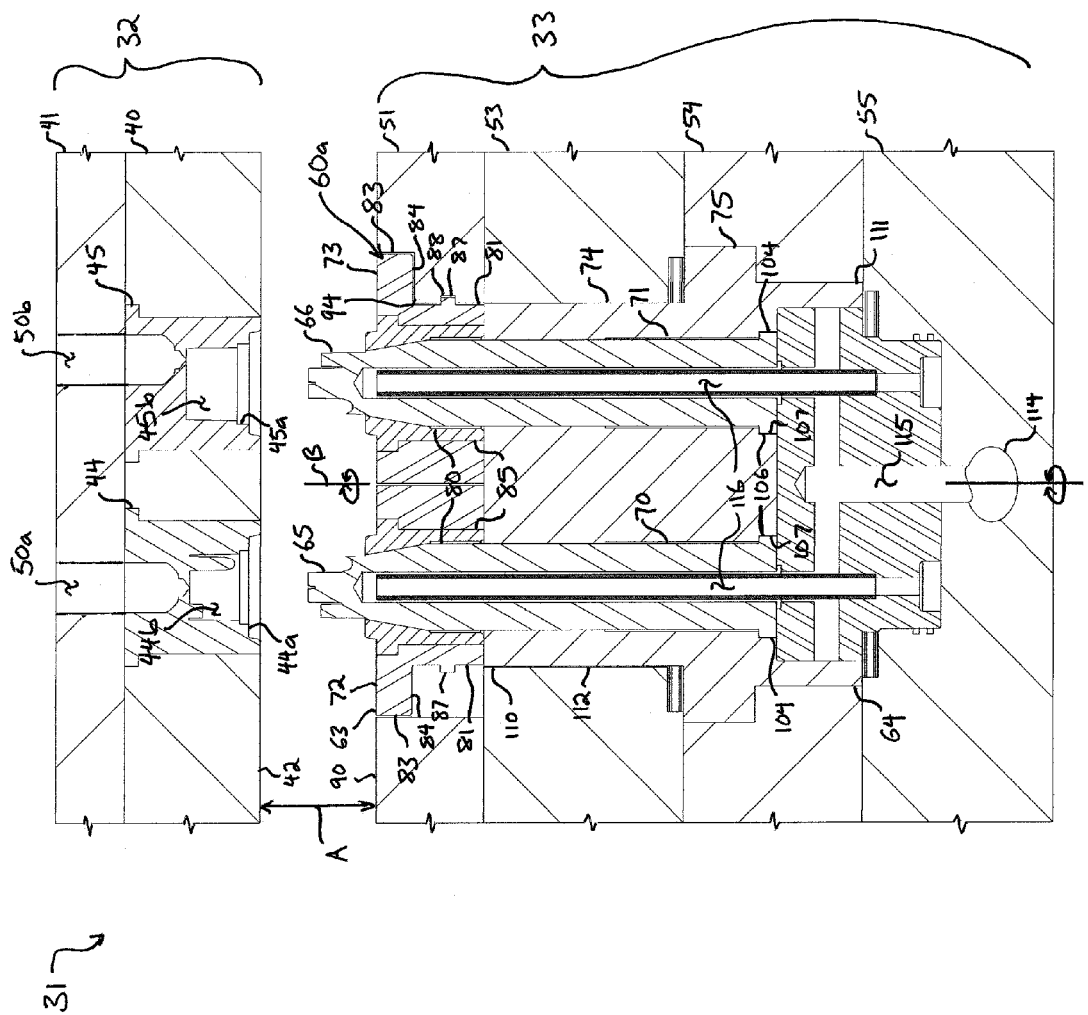
FIGS. 7-15 are enlarged partial section views taken along the line 7-7 of FIG. 1 showing a sequence of operational steps of the mold assembly of FIG. 1.

FIG. 2 illustrates the mold assembly 31 in detail in partially-exploded view. Fixed mold half 32, shown in both FIG. 2 and FIG. 3, includes a front plate 40 and a rear plate 41. The front plate 40 has an inner face 42 directed toward the moveable mold half 33, an opposed outer face 43, and carries first and second mold cavity assemblies 44 and 45 between the inner and outer faces 42 and 43. Shown in FIG. 3, the first and second mold cavity assemblies 44 and 45 are arranged in an array of sixteen groups 46a, 46b, 46c, . . . 46p across plate 40 (only groups 46a, 46b, 46c, and 46d are visible in FIG. 2). In other embodiments, the fixed mold half 32 may have two, three, or several groups of mold cavity assemblies 44 and 45, depending on the number of mold core assemblies in the mold assembly 31. The groups of first and second mold cavity assemblies 44 and 45 are identical in every respect to each other except in location and as described herein, and as such, the discussion will refer only to the group denoted with reference character 46a, with the understanding that the discussion applies equally to the other groups. The first and second mold cavity assemblies 44 and 45 are cylindrical fixtures that are secured within bores through the front plate 40. The first and second mold cavity assemblies 44 and 45 are formed with concave first and second contours 44a and 45a which extend into the first and second mold cavity assemblies and bound first and second mold cavities 44b and 45b, respectively. As such, and as illustrated in FIG. 7, the first and second contours 44a and 45a extend inwardly from the inner face 42 of the front plate 40 contiguously with the inner face 42. The first and second mold cavities 44b and 45b are coupled in fluid communication with runners 50a and 50b formed through the front and rear plates 40 and 41, so that molten plastic may be fed through the fixed mold half 32 into the first and second mold cavities 44b and 45b, as will be understood by those skilled in the art. Fixed mold half 32, and its constituent elements, are constructed from a material or combination of materials which possess rugged, durable, and heat-resistant material characteristics, such as steel, aluminum, and the like.

Figure 4:
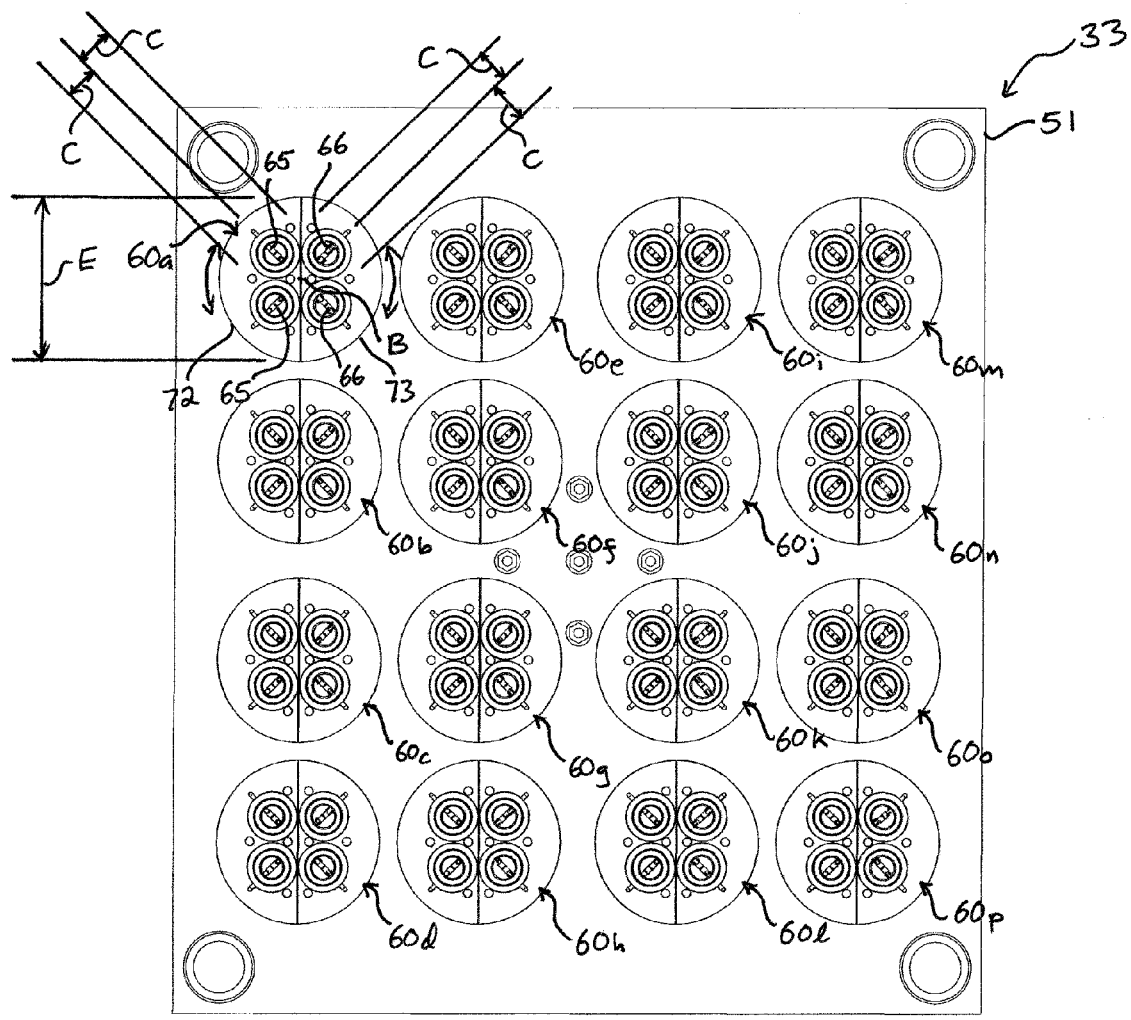
FIG. 4 is a front view of the front face of the moveable mold half of the mold assembly of FIG. 1.

FIG. 2 and FIG. 4 illustrate the moveable mold half 33. The moveable mold half 33 includes a stripper plate 51 at a forward or inner end 52 of the moveable mold half 33 and plates 53, 54, and 55 at a rear or outer end 56 of the moveable mold half 33. Sixteen mold core assemblies 60a, 60b, 60c, . . . 60p are mounted in the moveable mold half 33 (only 60a, 60b, 60c, 60d, 60e, 60i, and 60m are visible in FIG. 2) between the inner and outer ends 52 and 56 for rotation in cylindrical receptacles or holds 61 formed through the stripper plate 51 and the plates 53, 54, and 55. The mold core assemblies are identical in every respect to each other except in location and as described herein, and as such, the ensuing discussion will refer only to the mold core assembly denoted with reference character 60a, with the understanding that the discussion of mold core assembly 60a applies equally to the other mold core assemblies. In other embodiments, the moveable mold half 33 may have two, three, or several groups of mold core assemblies.

Figure 5:
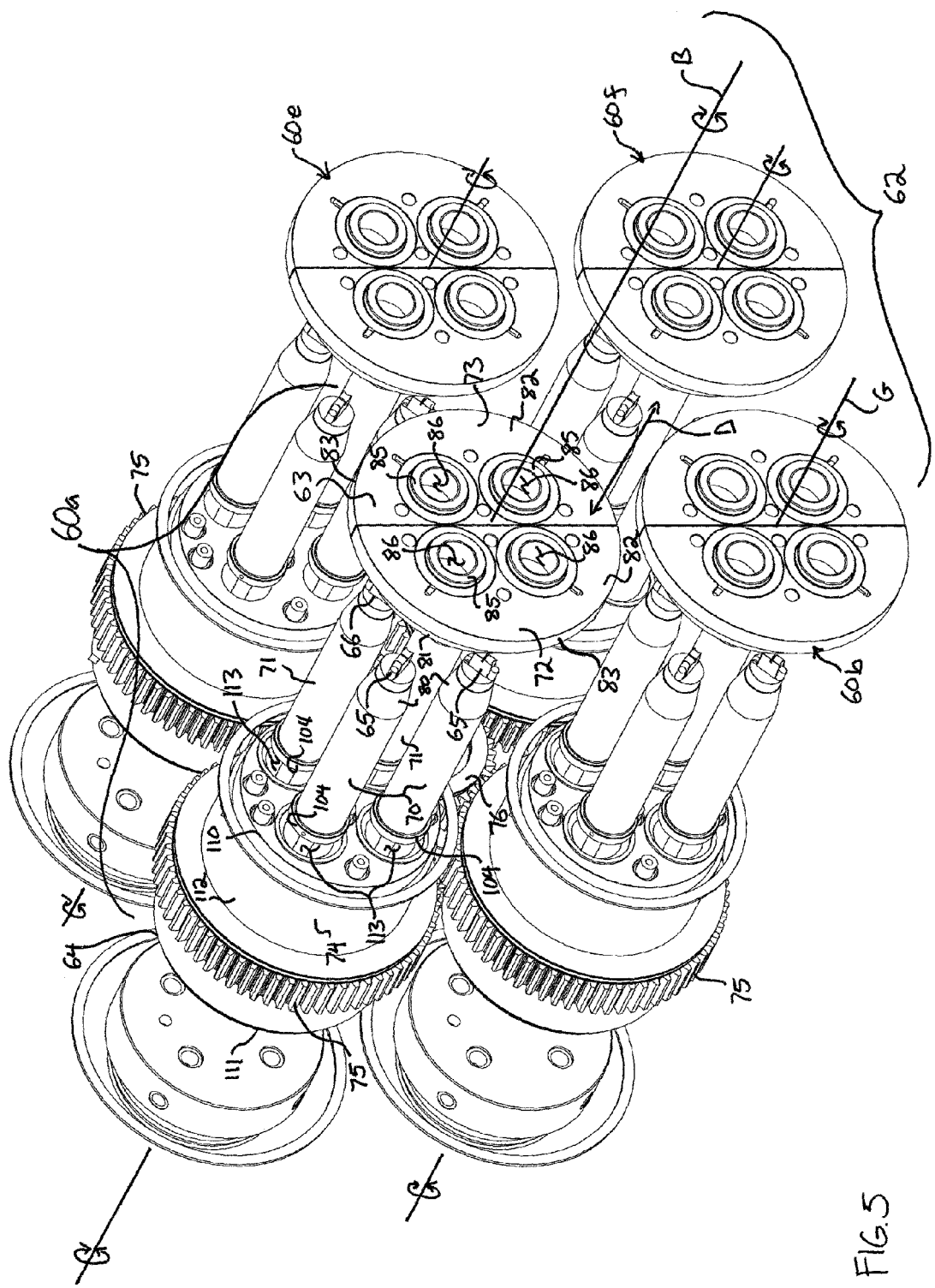
FIG. 5 is an enlarged partially-exploded perspective view of a group of mold core assemblies of the mold assembly of FIG. 1.

The mold core assembly 60a is shown in detail in FIG. 5 along with three other mold core assemblies 60b, 60e, and 60f organized in a cluster or group 62, of which there are three other identical groups in the mold assembly 31. The mold core assembly 60a is mounted for rotation through different degrees of rotation in clockwise and counter-clockwise directions about an axis B as indicated in FIG. 5. Axis B is parallel to the direction of reciprocal movement in which the moveable mold half 33 moves to open and close mold assembly 31. The mold core assembly 60a is symmetric with respect to a plane that includes axis B and vertically bisects the mold core assembly 60a, such that rotation of the mold core assembly 60a about axis B by 180 degrees affects no change in the apparent structure or arrangement of the mold core assembly 60a.

The mold core assembly 60a extends between front and rear ends 63 and 64. The mold core assembly 60a includes first and second mold cores 65 and 66 at the front end 63, first and second mold core mounts 70 and 71 carrying first and second mold cores 65 and 66, respectively, first and second collars 72 and 73 mounted for reciprocal movement axially along first and second mold cores 65 and 66, respectively, a chuck 74 to which the first and second mold core mounts 70 and 71 are secured, and a driven or spur gear 75 attached to the chuck 74 for rotating the entire mold core assembly 60a. The spur gear 75 is engaged with a drive mechanism or drive gear 76 at the center of the group 62 of the mold core assemblies 60a, 60b, 60e, and 60f, so that rotation of the drive gear 76, such as by electric motor, a mechanical drive shaft, or the like, imparts corresponding rotation to the spur gear 75 and to the mold core assembly 60a about axis B. Drive gear 76 is carried by mold half 33 for rotation within a cavity which is coupled to the holds 61 so that drive gear 76 can meshingly engage the spur gear 75. Each of the mold core assemblies 60a, 60b, 60e, and 60f in the group 62 has a spur gear 75 which is engaged to the drive gear 76 at the center of the group 62, so that rotation of the drive gear 76 imparts corresponding rotation to each of the mold core assemblies in the group 62 about their own respective axes of rotation. Alternatively, in another embodiment, each mold core assembly is individually controlled by a servomotor coupled to the spur gear 75 or axially coupled directly to the mold core assembly to impart rotation. In such embodiments, each mold core assembly can be individually rotated about its respective axis without rotating any other mold core assemblies, or each mold core assembly can be rotated by different amounts.

First and second mold cores 65 and 66 are disposed at front ends 80 of the first and second mold core mounts 70 and 71, respectively. In the embodiment shown in FIG. 5, the first and second mold cores 65 and 66 are formed integrally as part of the first and second mold core mounts 70 and 71, but may, in other embodiments, be caps or fixtures releasably secured to the front ends 80 of the first and second mold core mounts 70 and 71 to allow for removal and replacement of the first and second mold cores 65 and 66. First and second mold cores 65 and 66 are identical in structure, mirrored in arrangement, and are given different reference numerals for reasons that will become clear later. In the embodiment illustrated in these drawings, the first and second mold cores 65 and 66 are paired and are symmetric with respect to axis B, and, as shown with brief reference to FIG. 4, are each spaced apart from axis B by a distance C, such that rotation of the mold core assembly 60a by increments of ninety degrees will result in each of the first and second mold cores 65 and 66 being positioned in a previous location of one of the other first and second mold cores 65 and 66. In other embodiments with fewer or greater numbers of the first and second mold cores 65 and 66 than shown in FIG. 4, axis B is an axis of symmetry but rotation of the mold core assembly by greater or smaller increments, respectively, will result in each of the first and second mold cores 65 and 66 being positioned in a previous location of one of the other first and second mold cores 65 and 66. For instance, in an embodiment in which there is one first mold core 65 and one second mold core 66, rotation of the mold core assembly by increments of one hundred eighty degrees will result in the first and second mold cores 65 and 66 being positioned in the previous location of the second and first mold cores 66 and 65, respectively. In another example, in an embodiment in which there are three first mold cores 65 and three second mold cores 66, rotation of the mold core assembly by increments of sixty degrees will result in each of the first and second mold cores 65 and 66 being positioned in a previous location of one of the other first and second mold cores 65 and 66. In yet another example, in an embodiment in which there are four first mold cores 65 and four second mold cores 66, rotation of the mold core assembly by increments of forty-five degrees will result in each of the first and second mold cores 65 and 66 being positioned in a previous location of one of the other first and second mold cores 65 and 66.

In operation, when the mold assembly 31 is in a closed condition, injections of molten plastic material are repeatedly applied around the first and second mold cores 65 and 66, so that the first and second mold cores 65 and 66 define the interior shape and structure of the articles being molded. As such, the first and second mold cores and mold core mounts 65, 66, 70, and 71 are subjected to cyclical temperatures and pressures and are constructed from a material or combination of materials which possess rugged, durable, and heat-resistant material characteristics, such as steel, aluminum, and the like.

The first and second collars 72 and 73 are carried by the first and second mold cores 65 and 66 and the first and second mold core mounts 70 and 71 proximate to the first and second mold cores 65 and 66, respectively, for reciprocal movement between extended and retracted positions along a direction indicated by the double-arrowed line D in FIG. 5. Line D is parallel to the direction of reciprocation in which the moveable mold half 33 moves. The first and second collars 72 and 73 each have a body 81 with a front face 82 and a semi-annular flange 83 extending radially outwardly from the body 81. As shown in the section views of FIGS. 7-15, the flanges 83 have back surfaces 84, and the bodies 81 of the first and second collars 72 and 73 are formed with tongues 87 projecting outwardly from the bodies 81. The first and second collars 72 and 73 both have a diameter E as indicated in FIG. 4. Each of the first and second collars 72 and 73 have sleeve bushings or stripper rings 85 secured in holes 86 through the bodies 81 of the first and second collars 72 and 73. The first and second collars 72 and 73 are carried by the stripper rings 85 over the first and second mold core mounts 70 and 71, respectively, in a closely-encircling engagement that allows the first and second collars 72 and 73 to slide smoothly along the first and second mold core mounts 70 and 71 in reciprocal directions along line D. The stripper rings 85 are manufactured or machined to a fine tolerance to slide smoothly over the first and second mold core mounts 70 and 71 and prevent flashing of plastic material between the stripper rings 85 and the first and second mold core mounts 70 and 71 during operation.

Figure 6:
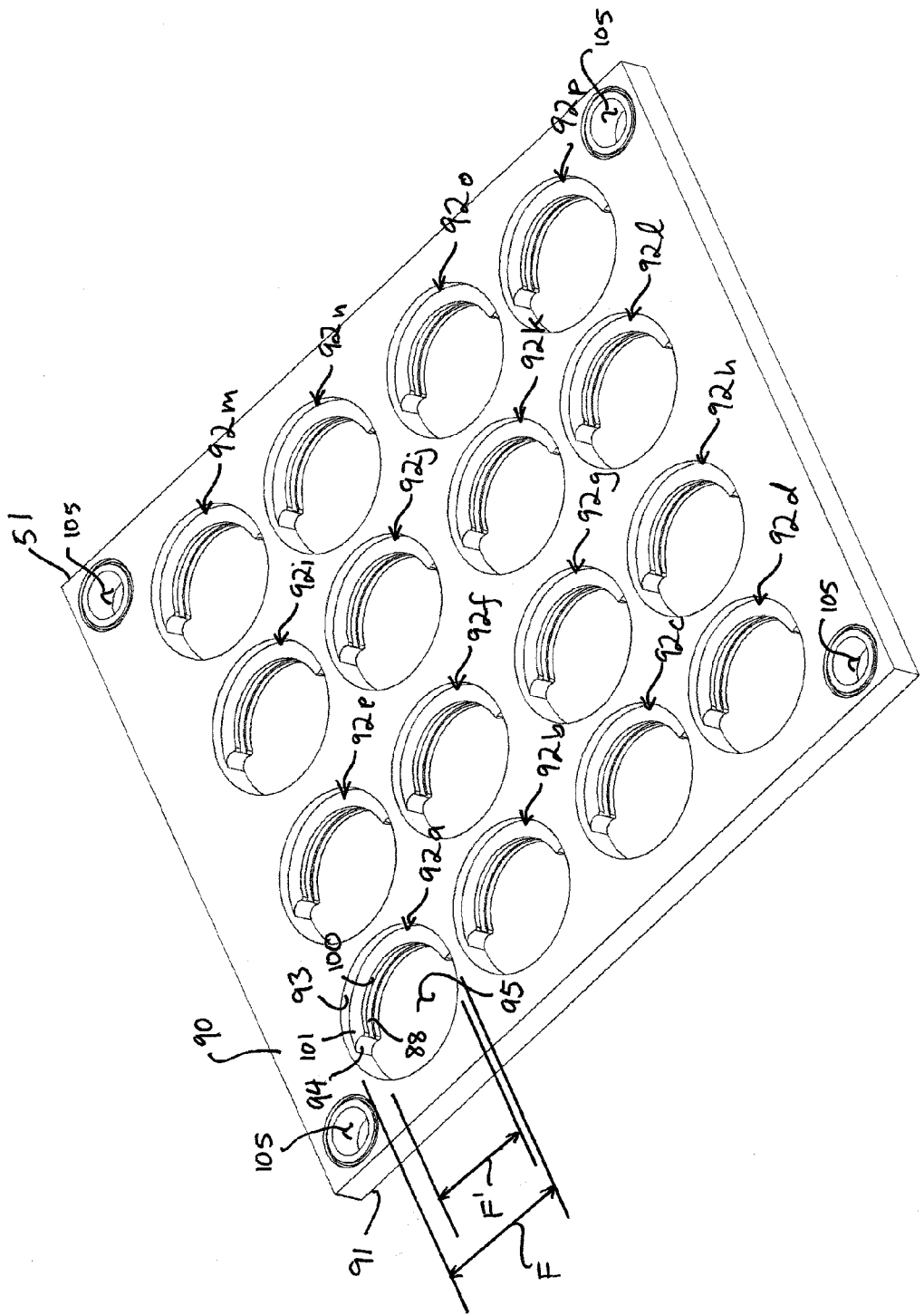
FIG. 6 is a perspective view of a stripper plate of the moveable mold half of the mold assembly of FIG. 1.
Figure 16:
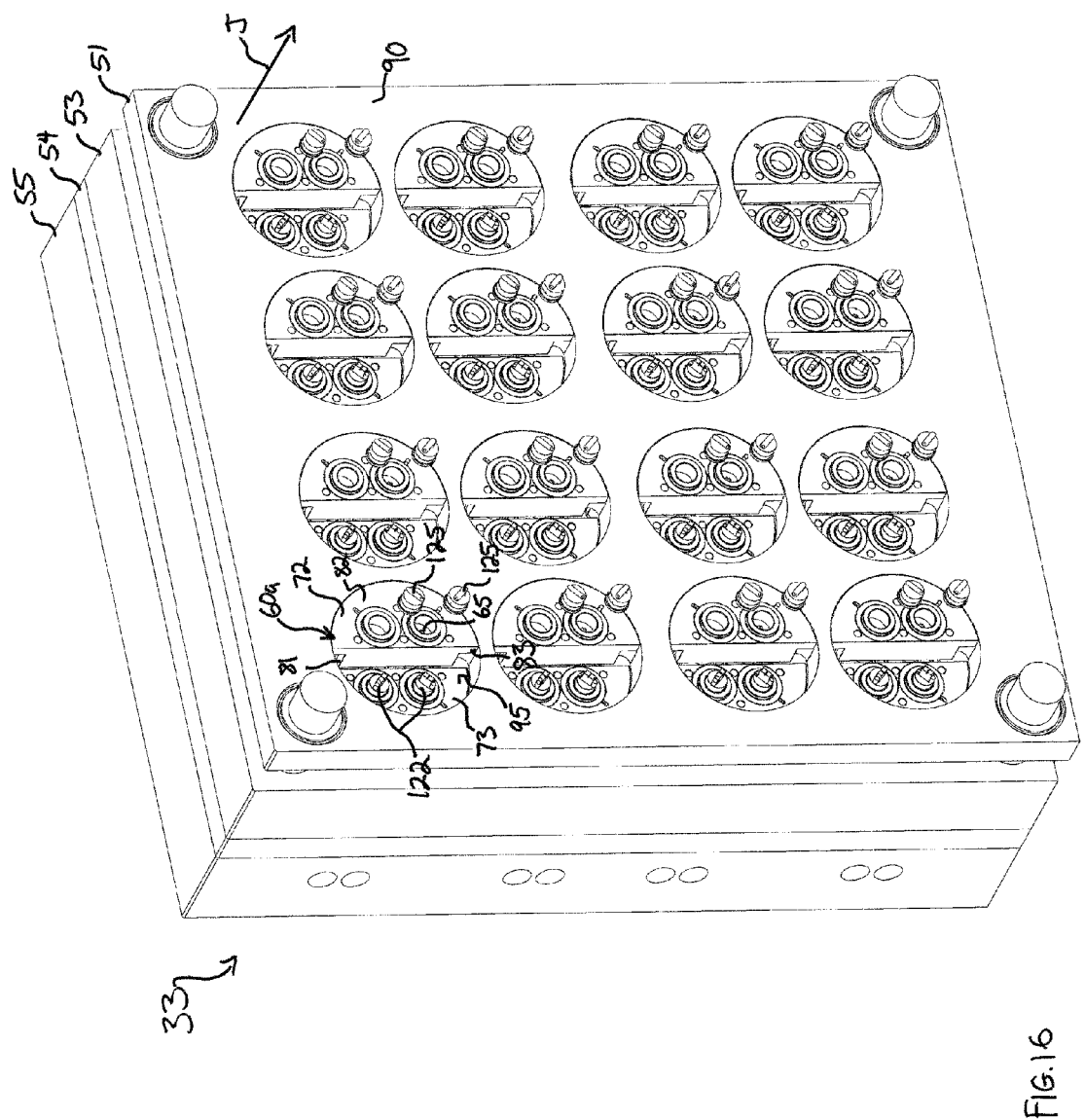
FIG. 16 is a perspective view of the mold assembly of FIG. 1 arranged in the condition of the operational step shown in FIG. 15.

The first and second collars 72 and 73 are carried by the stripper plate 51. As seen in FIG. 2, the stripper plate 51 moves in reciprocal directions indicated by double-arrowed line J. The first and second collars 72 and 73 are engaged in contact with the stripper plate 51 such that when the stripper plate 51 reciprocates, one of the first and second collars 72 and 73 also reciprocates along the respective first and second mold core mount 70 and 71. FIG. 16, briefly, shows the first collar 72 in an extended position with the stripper plate 51. Engagement of complementary tongue 87 and groove 88 structures in the first and second collars 72 and 73 and the stripper plate 51, respectively, affects this cooperative movement. FIG. 6 illustrates the stripper plate 51 in isolation. The stripper plate 51 has a front face 90 and an opposed rear face 91 and is formed with a number of hole structures which are each portions of the circular holds 61 that extend through the moveable mold half 33 (as shown in FIG. 2). In this embodiment, stripper plate 51 includes sixteen hole structures 92a, 92b, 92c, . . . 92p, each of which is identical in structure, and as such, the ensuing discussion will be made only with respect to the hole structure denoted with reference character 92a, with the understanding that the discussion applies equally to the other hole structures. In other embodiments, the stripper plate 51 may have two, or three, or several hole structures 92, depending on the number of mold core assemblies in the mold assembly 31. The hole structure 92a is annular, has an inner sidewall 93, and has a diameter F as indicated in FIG. 6. Diameter F is slightly larger than diameters E of the first and second collars 72 and 73. A semi-annular shoulder 94 is formed on the inner sidewall 93 along one-half of the hole structure 92 and projects into the hole bound by the inner sidewall 93, and an opposed semi-circular opening 95 is formed on the other one-half of the hole structure 92 through the stripper plate from the front face 90 to the rear face 91. An annular groove 88 extends into the shoulder 94. The shoulder 94 has a diameter F' which is less than the diameter F of the hole structure 92 and slightly less than the diameter E of the first and second collars 72 and 73. The shoulder 94 has a semi-annular inner face 100 and extends from the rear face 91 along the inner sidewall 93 to a top 101 located at a generally intermediate location between the front and rear faces 90 and 91 of the stripper plate 51. With reference to the exploded view of FIG. 2, the stripper plate 51 is mounted to the plate 53 in the moveable mold half on guide pins 102 which are secured to the stripper plate 51 at receptacles 105 formed in the corners of the stripper plate 51. The guide pins 102 correspond to and nest within slots 103 formed in fixed mold half 32 to ensure alignment of the corresponding elements of the fixed and moveable mold halves 32 and 33 when the mold half 33 moves between the open and closed positions. The guide pins 102 additionally extend and retract in the same direction of reciprocation as that of the mold assembly 31 to move the stripper plate 51 between extended and retracted positions along line J with respect to the other plates 53, 54, and 55 of the moveable mold half 33. The stripper plate 51 is constructed from a material or combination of materials which possess durable and heat-resistant material characteristics, such as iron, steel, and the like.

Returning to FIG. 5, the first and second mold core mounts 70 and 71 are elongate cylinders extending between the front and rear ends 63 and 64 of the mold core assembly 60a. Back ends 104 of the first and second mold core mounts 70 and 71 are attached and secured to the chuck 74 at the rear end 64 of the mold core assembly 60a to rotate together with the chuck 74. The first and second mold core mounts 70 and 71 are constructed from a material or combination of materials which possess rigid, durable, and heat-resistant material characteristics, such as steel, aluminum, and the like, and as such, provide a stable support for the first and second mold cores 65 and 66.

The chuck 74 is a cylindrical base having a front end 110, a rear end 111, and a sidewall 112 extending between the front and rear ends 110 and 111. The chuck 74 is geometrically centered on axis B. Four cylindrical holds 113, clustered symmetrically around axis B, extend through chuck 74 from the front end 110 to the rear end 111 to accommodate the first and second mold core mounts 70 and 71. The first and second mold core mounts 70 and 71 are secured within the holds 113 by shoulders 106 at the back ends 104 of the first and second mold mounts 70 and 71 which engage snugly within slots 107 extending from the holds 113 into the chuck 74. The first and second mold core mounts 70 and 71 are approximately the same length as the chuck 74, such that when the first and second mold core mounts 70 and 71 are secured within the holds 113 (as shown in FIG. 7), backs 104 of the first and second mold core mounts 70 and 71 are located proximate to the rear end 111 of the chuck 74, and the fronts 80 of the first and second mold core mounts 70 and 71 and the first and second mold cores 65 and 66 project just beyond the front end 110 of the chuck 74. Returning to FIG. 5, the chuck 74 is integrally formed with spur gear 75 about sidewall 112 proximate to the rear end 111 of the chuck 74, such that rotation of the gear 75 imparts corresponding rotation on chuck 74 so as to move the first and second mold cores 65 and 66 between different positions about axis B. The mold core assembly 60a includes an internal liquid cooling system, of which a portion is seen in the section view of FIG. 7. The cooling system includes an inlet or source 114 of water in plate 55 with conduits 115 that connect source 114 in fluid communication to hollows 116 extending within the first and second mold core mounts 70 and 71 and the first and second mold cores 65 and 66.

As has been discussed, the mold core assembly 60a is an assembly of structural elements for rotation about a single axis B. As shown in FIG. 2, there are a number of mold core assemblies 60a, 60b, 60c, etc. arranged throughout the mold assembly 31, each capable of rotation about its own respective axis. In FIG. 2, in addition to the mold core assembly 60a which has been the subject of this discussion, the mold core assemblies 60b, 60c, 60d are also specifically identified, and, in addition to possessing all of the structural features described with reference to the mold core assembly 60a, have distinct axes of rotation G, H, and I about which each respectively rotates. Axes B, G, H, and I are spaced apart from each other, parallel to each other and to the direction of movement in which the moveable mold half 33 reciprocates indicated by line A, and are centered with respect to the mold core assemblies 60a, 60b, 60c, and 60d, respectively. Indeed, each of the mold core assemblies in the mold assembly 31 includes a distinct axis about which it rotates, and each of these axes are parallel to the direction of reciprocation indicated by line A. Only the mold core assemblies, and the constituent parts thereof, rotate during operation of the mold assembly 31, and thus the inertial mass or weight of parts required to be rotated is kept to a minimum. The relatively small mass of each of the mold core assemblies that needs to be rotated, compared to the mass of an entire plate carrying mold cores, is minimal.

Operation of the mold assembly 31 according to the principles of the invention will now be discussed with reference to FIGS. 7-15, which are section views illustrating the mold core assembly 60a surrounded by a portion of the mold assembly 31. FIG. 7 illustrates the mold assembly 31 in an initial, starting condition in an open position with the moveable mold half 33 spaced apart from the fixed mold half 32. In this starting condition, the mold core assembly 60a is rotated into a start position in which the first mold core 65 is registered with the first mold cavity 44b and the second mold core 66 is registered with the second mold cavity 45b. The stripper plate 51 and the first and second collars 72 and 73 are in the retracted positions. The back surface 84 of the flange 83 of the second collar 73 is in contact with the shoulder 94 of the stripper plate 51, and the bodies 81 of the first and second collars 72 and 73 are in contact with the front end 110 of the chuck 74. In this position, the tongue 87 of the second collar 73 is located within the groove 88 of the stripper plate 51, and the stripper plate is maintained in the retracted position by the guide pins 102, so that the second collar 73 is held in position. An object to be molded over may be pre-loaded into the mold assembly 31 by applying the object over the first or second mold cores 65 and 66, in a manufacturing process known as over-molding as is understood by one having skill in the art. In the embodiment illustrated in FIG. 7, however, both the first and second mold cores 65 and 66 are free of objects or material in the starting condition for preparation for molding.

Figure 8:
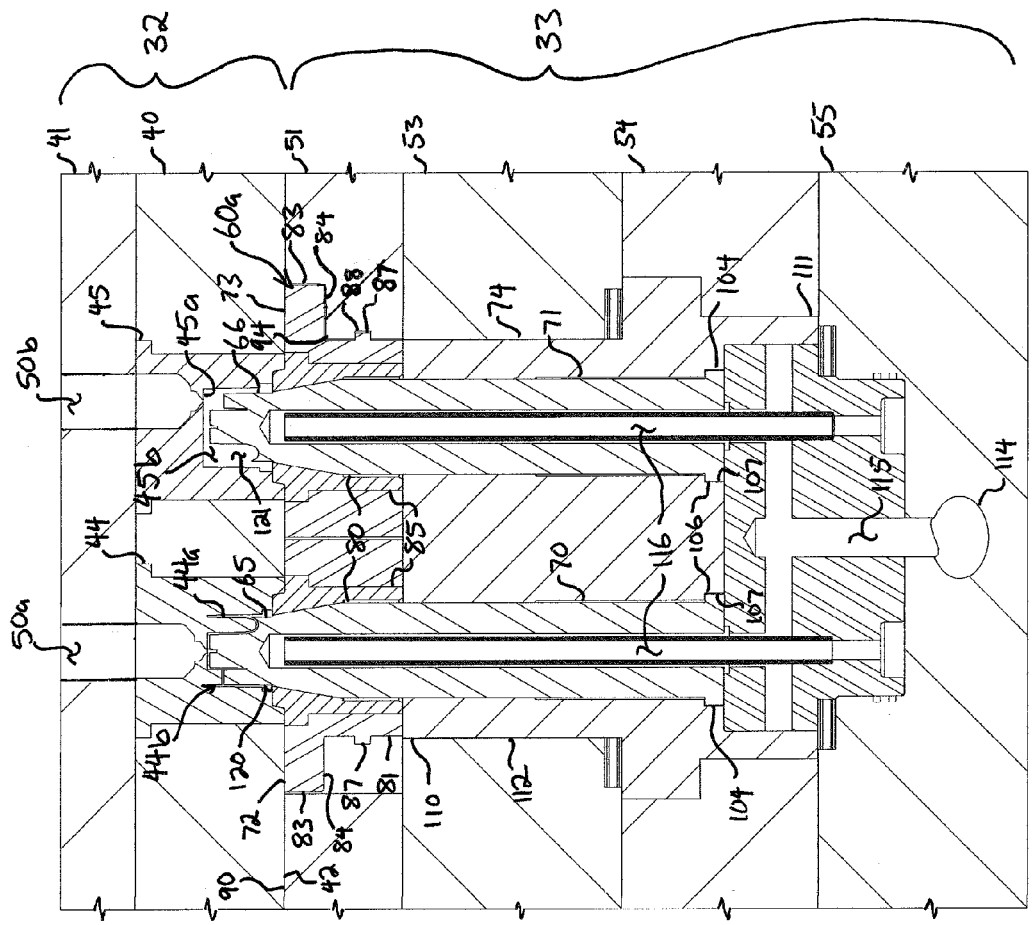

Operation proceeds by moving the mold assembly 31 into the closed position illustrated in FIG. 8 by activating and extending the scissor arms 35 (shown in FIG. 1) mounted to the moveable mold half 33 to move the moveable mold half 33 toward the fixed mold half 32. The inner face 42 of the plate 40 of the fixed mold half 32 is received against the front face 90 of the stripper plate 51. In the closed position, the mold assembly 31 is placed in a first molding configuration in which the mold assembly 31 is ready to receive an injection of a first plastic material. In the first molding configuration of the mold assembly 31, the first mold core 65 is received within the first mold cavity 44b and a first molding cavity or shot volume 120 is formed between the first mold core 65 and the first contour 44a. First shot volume 120 is a continuous space or volume enclosed between the first mold core 65 and the first contour 44a and coupled in fluid communication to the runner 50a in preparation to receive an injection of the first plastic material. The second mold core 66 is received within the second mold cavity 45b and an enclosed, continuous space or volume 121 is formed between the second mold core 66 and the second contour 45a.

Figure 9:
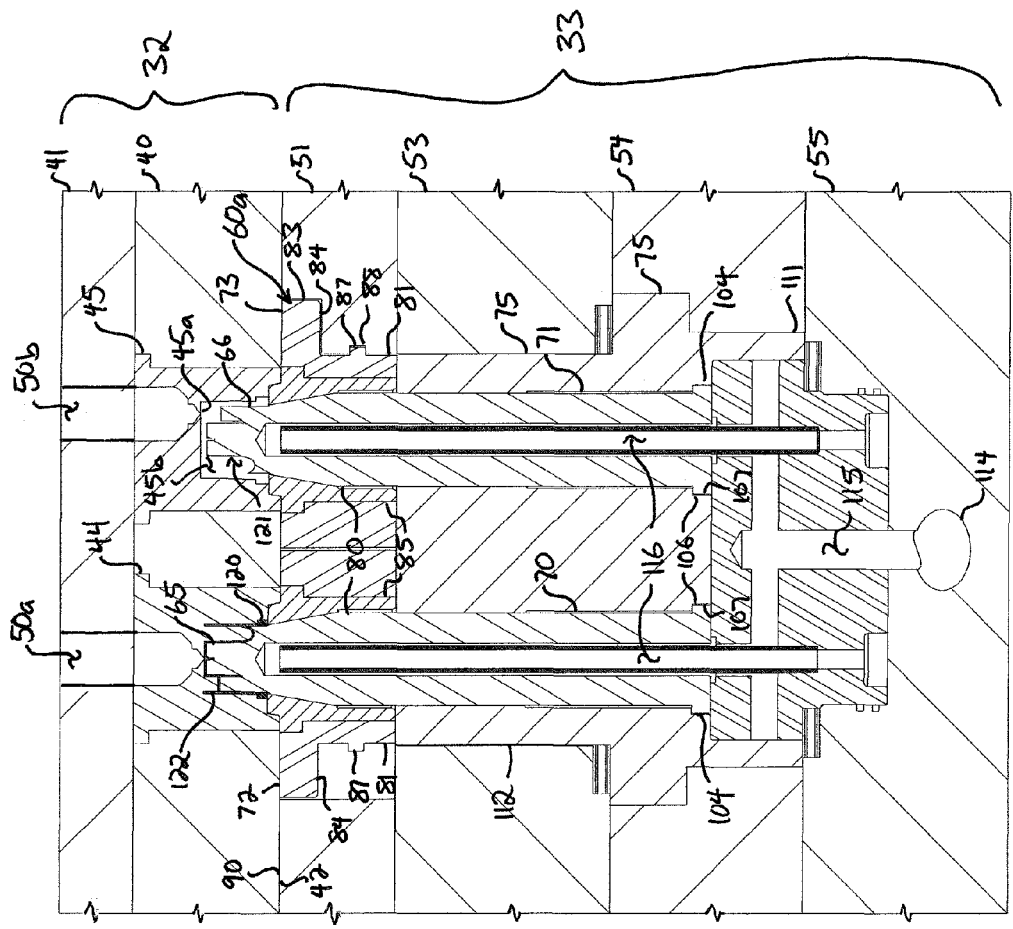

The injection of the first plastic material is then made, as shown in FIG. 9. It should be noted that, while this discussion refers to an injection of plastic material, any suitable material may be injected into the mold assembly 31 for molding, such as metal, plastic, chocolate, or other materials. This discussion refers to plastic material merely for simplicity. The first plastic material is injected and flows into the first shot volume 120 from the runner 50a. At this stage, an injection is not made into the volume 121 between the second mold core 66 and the second contour 45a. As will be understood by the skilled practitioner, the injection of the first plastic material through the runner 50a and into the first shot volume 120 affects a corresponding force on the mold assembly 31 around the injection. Because the mold core assemblies are distributed evenly in an array across the mold assembly 31, however, and because injections are made simultaneously at each mold core assembly in the same manner as described here, the applied forces of each injection are also distributed evenly across the mold assembly 31, producing zero net torque on the mold assembly 31. Once the injections have been made, a cooling liquid is circulated from the source 114 and through the channels 115 and hollows 116 in the first and second mold cores 70 and 71 which causes the first plastic material to cool and harden into a partially-complete article 122 in the first shot volume 120 over the first mold core 65, as shown in FIG. 9.

Figure 10:
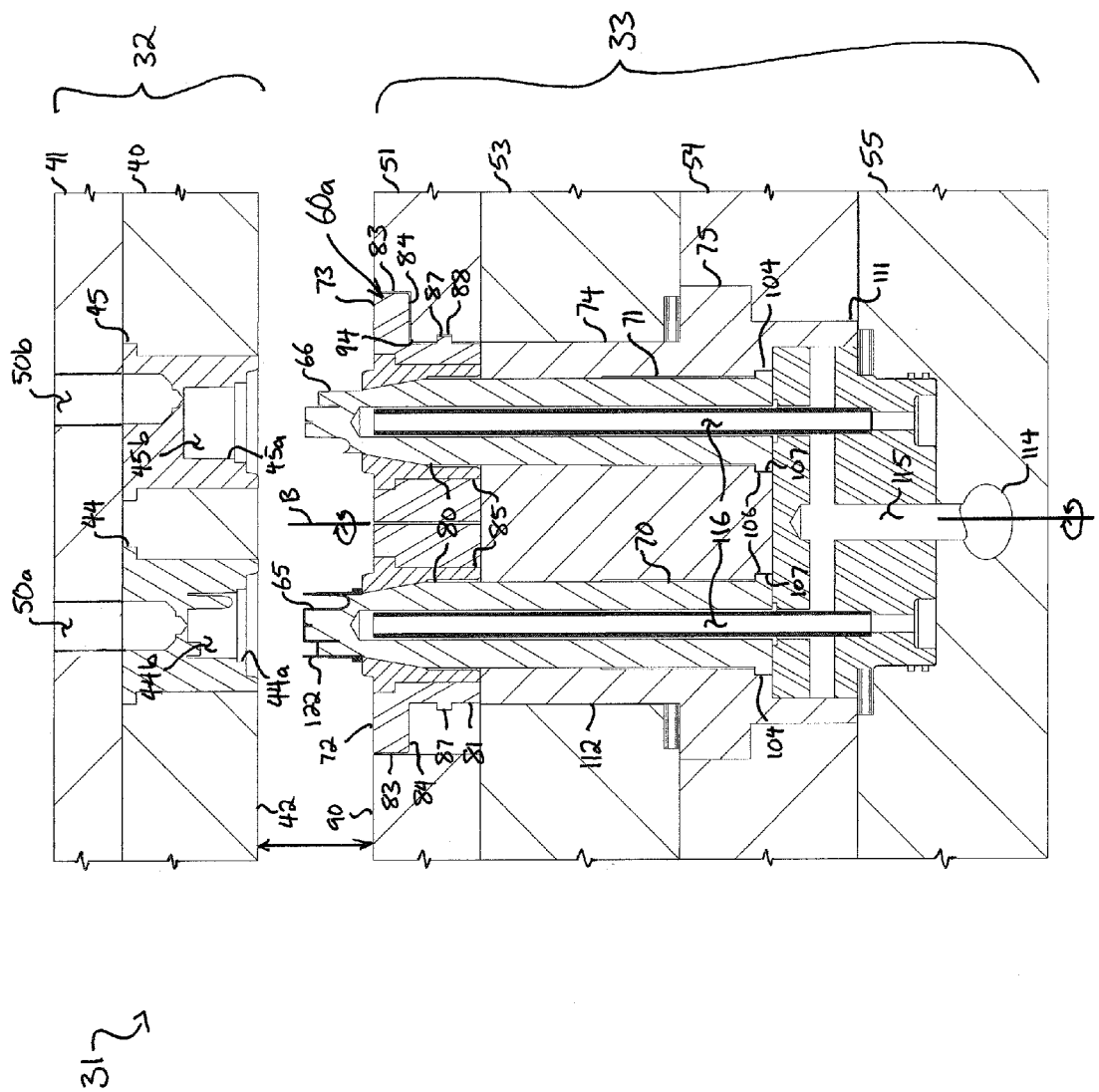
Figure 11:
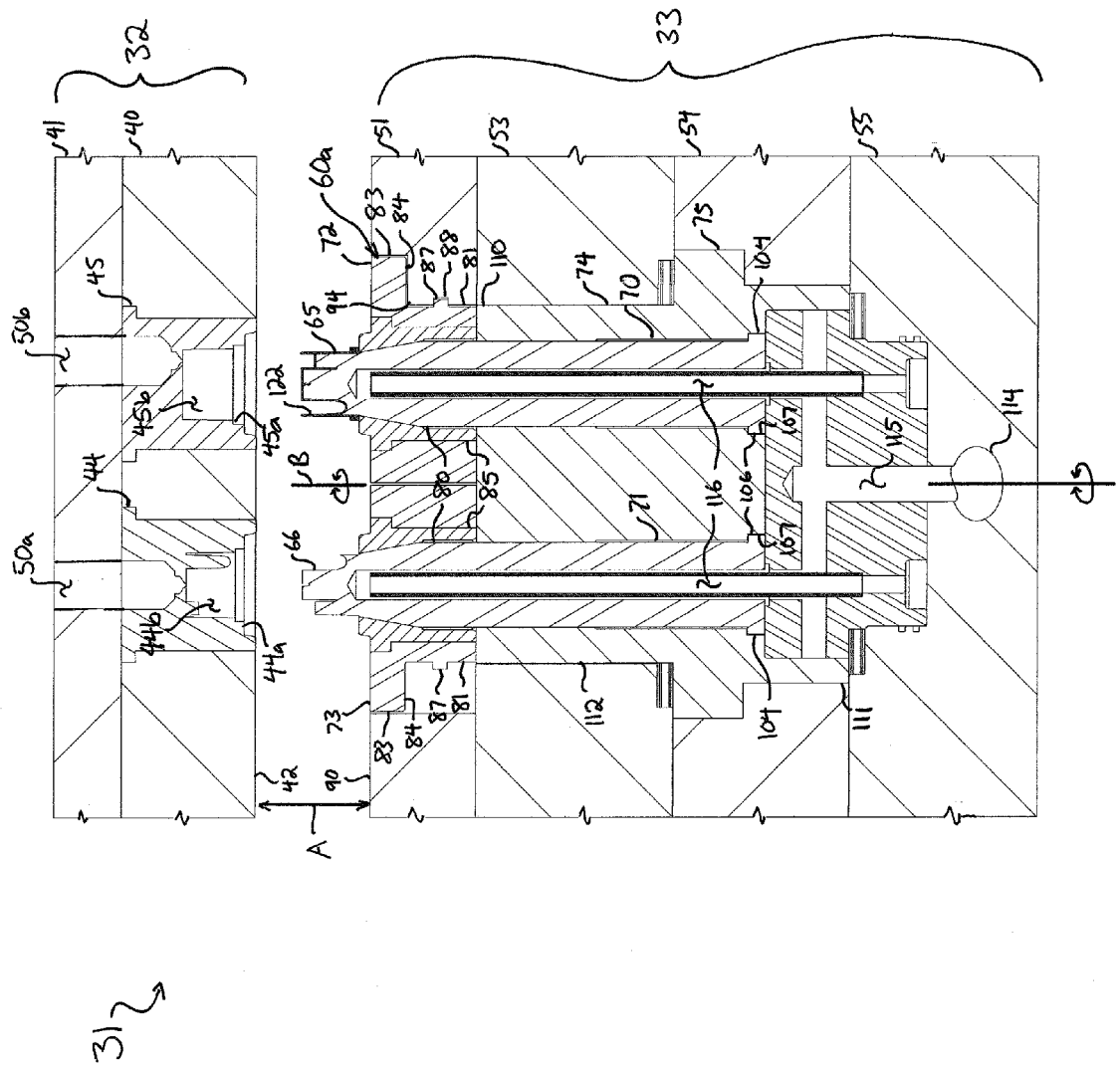

Referring next to FIG. 10, with the partially-complete article 122 now hardened over the first mold core 65, the mold assembly 31 is moved along the axis of reciprocation indicated by double-arrowed line A into the open position with the moveable mold half 33 spaced apart from the fixed mold half 32. Partially-complete article 122 is released from the first contour 44a and is carried on the first mold core 65. Drive gear 76 (in FIG. 5) is activated and rotates 180 degrees, causing spur gear 75, chuck 74, and mold core assembly 60a to rotate together 180 degrees about axis B within the hold 61 formed through the moveable mold half 33 until the mold core assembly 60a is placed into a second position, as shown in FIG. 11. In this second position of the mold core assembly 60a, the first mold core 65, with partially-complete article 122 still held on the first mold core 65, is registered with the second mold cavity 45b and the second contour 45a, and the second mold core 66 is registered with the first mold cavity 44b and the first contour 44a. In the moveable mold half 33, the flange 83 of the first collar 72 is received against and in contact with the shoulder 94 of the stripper plate 51. The engagement of the tongue 87 of the second collar 73 within the groove 88 of the stripper plate 51 holds the second collar 73 in place with respect to the stripper plate 51 and the second mold core 66.

Figure 12:
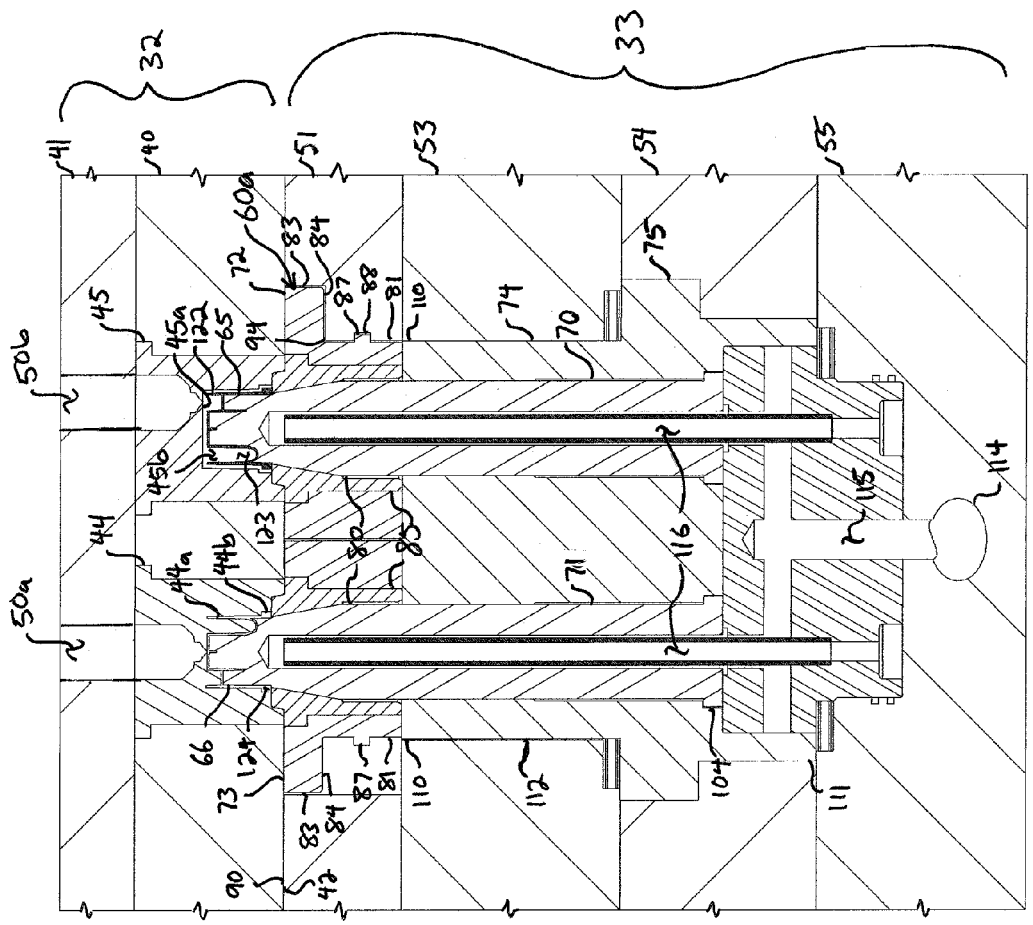

The operational cycle proceeds by moving the mold assembly 31 into the closed position illustrated in FIG. 12. The inner face 42 of the plate 40 of the fixed mold half 32 is received against the front face 90 of the stripper plate 51. In the closed position illustrated in FIG. 12, the mold assembly 31 is placed in a second molding configuration in which the mold assembly 31 is ready to receive an injection of the first plastic material and an injection of a second plastic material. In the second molding configuration of the mold assembly 31, the first mold core 65 carrying the partially-complete article 122 is received within the second mold cavity 45b, and a second molding cavity or shot volume 123 is formed between the first mold core 65 carrying the partially-complete article 122 and the second contour 45a. The second shot volume 123 is a continuous space or volume enclosed between the partially-complete article 122 and the second contour 45a and is coupled in fluid communication to the runner 50b in preparation to receive an injection of the second plastic material. The second mold core 66 is received within the first mold cavity 44b, and a third molding cavity or shot volume 124 is formed between the second mold core 66 and the first contour 44a. The third shot volume 124 is coupled in fluid communication to the runner 50a in preparation to receive an injection of the first plastic material. Because the first and second mold cores 65 and 66 are identical, the third shot volume 124 is identical in shape to the first shot volume 120 formed between the fixed and movable mold halves 32 and 33 when the mold assembly 31 is in the first molding configuration.

Figure 13:
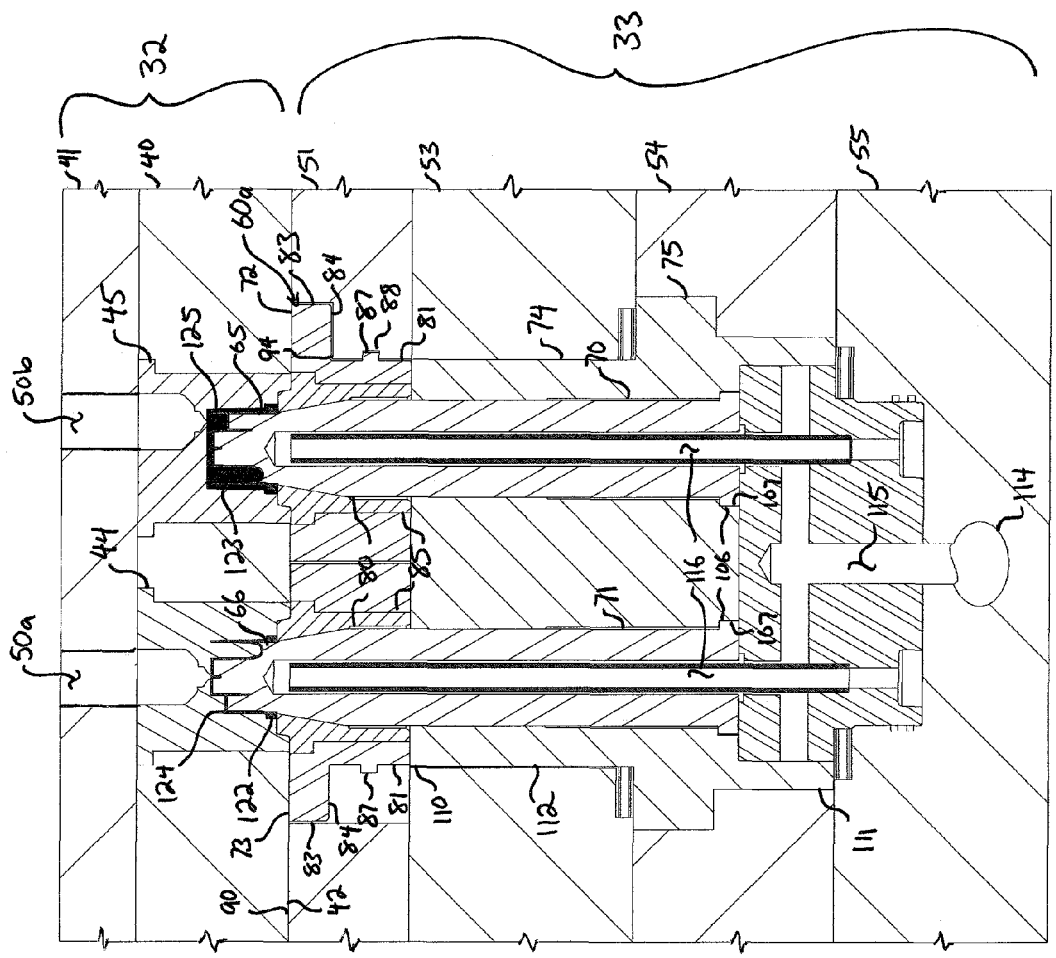

The injection of the first and second plastic materials are then made. These injections are made simultaneously. The second plastic material is injected into the mold assembly 31 and flows into the second shot volume 123 from the runner 50b. The second plastic material is applied over the partially-complete article 122. The first plastic material is also injected into the mold assembly 31 and flows into the third shot volume 124 from the runner 50a. The injections of the first and second plastic materials create corresponding forces within and on the mold assembly 31 around the injections. Because the mold core assemblies are distributed evenly in an array across the mold assembly 31, however, and because the injections are made simultaneously at each mold core assembly across the mold assembly 31 in the manner as just described, the applied forces are distributed evenly across the mold assembly 31, producing zero net torque on the mold assembly 31. The cooling liquid is then circulated from the source 114 and through the channels 115 and hollows 116 in the first and second mold cores 70 and 71, which causes the second and first plastic materials to cool and harden into a complete article 125 and a partially-complete article 122 in the second and third shot volumes 123 and 124, respectively, as shown in FIG. 13. The complete article 125 is an overlay of two component plastics: the second plastic material molded over the first plastic material and hardened into a single article. In this embodiment according to the principle of the invention, mold assembly 31 is useful for creating two-component articles such as complete article 125. As one having skill in the art will appreciate, articles having more than two components can be formed in a mold assembly incorporating more than two mold cores, more than two mold cavities, more than two injected plastic materials, and with rotation of the mold core in more than two increments of correspondingly smaller degrees of rotation, as is necessary to form the desired multi-component article. In this embodiment, however, the complete article 125 is a finished article for purposes of molding, and is ready to be released from the mold assembly 31 and dropped into the collection bin 34.

Figure 14:
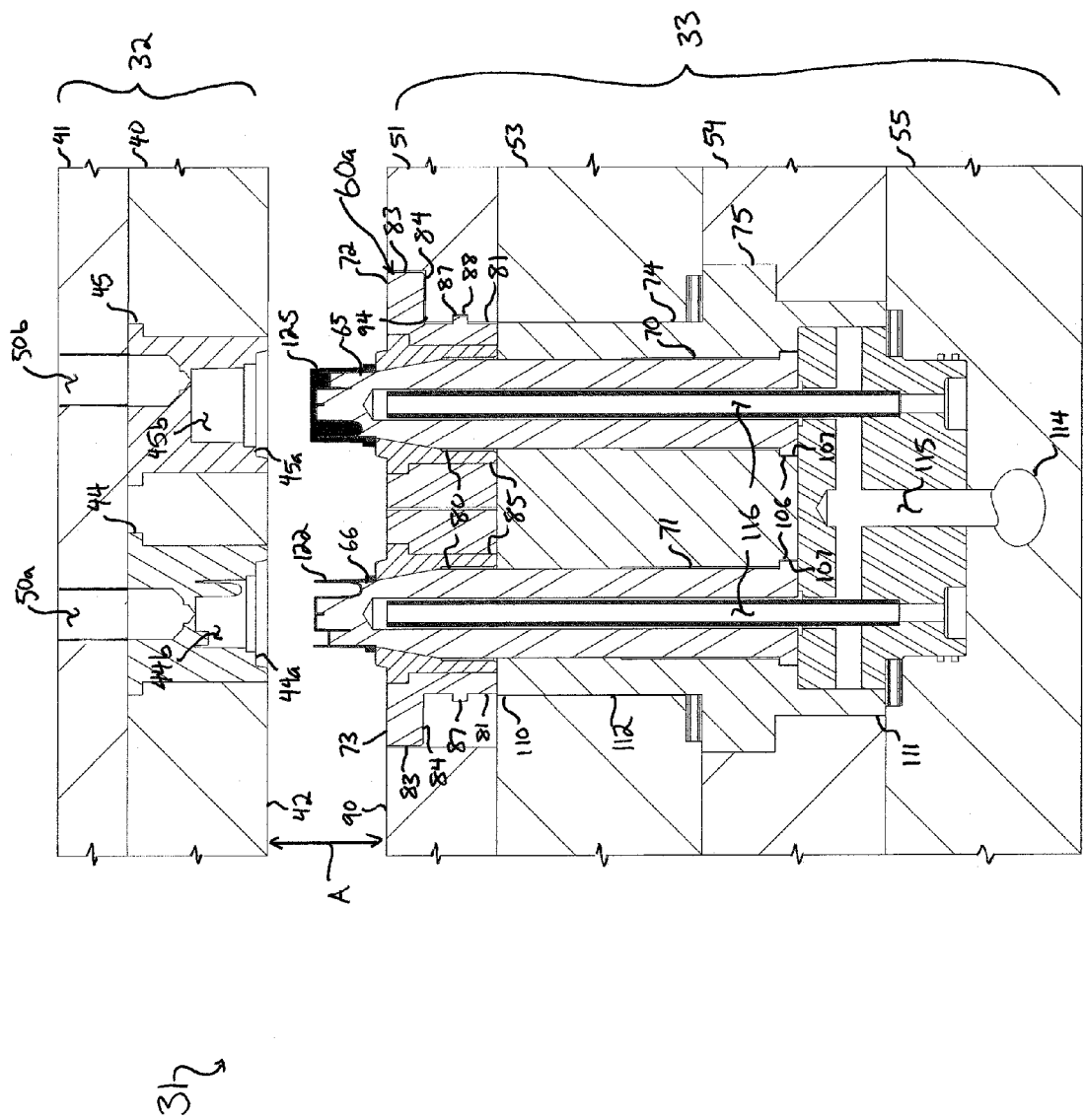
Figure 15:
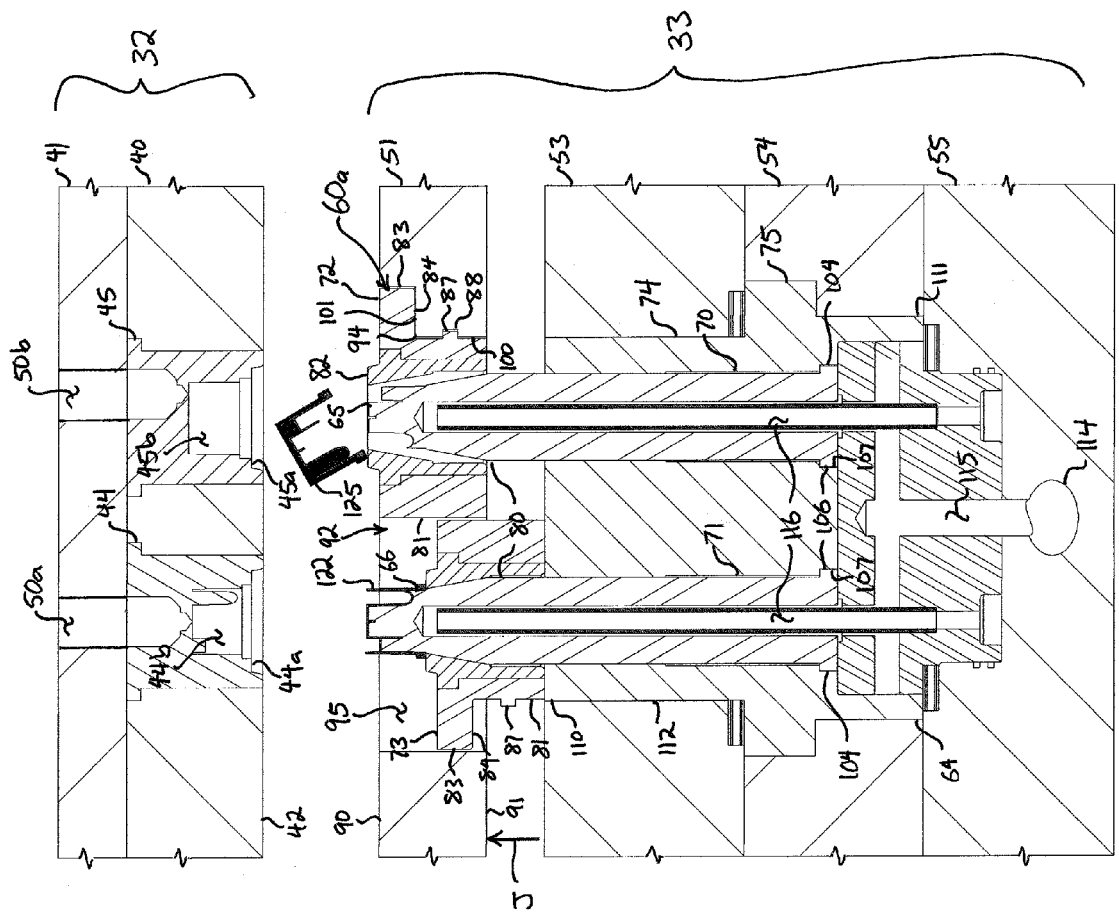

To release the complete article 125, the mold assembly 31 is first opened along the axis of reciprocation indicated by double-arrowed line A, as shown in FIG. 14. During the opening, the complete article 125 is released from the second contour 45a and is carried on the first mold core 65, and the partially-complete article 122 is released from the first contour 44a and is carried on the second mold core 66. With the mold assembly 31 in the open position, plate 40 is spaced apart from the stripper plate 51 to provide room for the complete article 125 to release from the first mold core 65. The stripper plate 51 is advanced away from plates 53, 54, and 55 in a direction indicated by arrowed line J, as shown in FIG. 15, by the extension of the guide pins 102 (shown previously in FIG. 2). As the top 101 of the shoulder 94 in the hole structure 92 of the stripper plate 51 encounters the flange 83 of the first collar 72, and with the tongue 87 engaged within the groove 88 in the shoulder 94, the first collar 72 moves forward with the stripper plate 51. The first collar 72 is fit and contained between the inner sidewall 93 of the hole structure 92, the inner face 100 of the shoulder 94, and the second collar 73, and surrounds the first mold core 65, so that the first collar 72 remains stationary in lateral directions with respect to the first mold core 65. The first mold core mount 70 is fixed within the chuck 74 and does not move forward, so that the front face 82 of the first collar 72 and the stripper ring 85 encounters and shears the complete article 125 off the first mold core 65. To fully release complete article 125 off the first mold core 65, the stripper plate 51, and the first collar 72 with it, moves from a retracted position in which the rear face 91 is behind the front end 80 of the first mold core and contacts plate 53 to an extended position in which the rear face 91 is spaced apart from the plate 53 and beyond the front end 80. The first collar 72, moving with the stripper plate 51, moves from a retracted position in which the front face 82 of the first collar 72 is behind the first mold core 65 to an extended position in which the front face 82 is flush with the first mold core 65.

Extension of the stripper plate 51 does not release the partially-complete article 122. The second collar 73, the second mold core 66, and the partially-complete article 122 carried on the second mold core 66 are positioned within the semi-circular opening 95 formed opposite the shoulder 94 in the hole structure 92 of the stripper plate 51. The diameter E of the second collar 73 is slightly less than the diameter F of the hole structure 92, so that, as the stripper plate 51 extends, the second collar 73, the second mold core 66, and the partially-complete article 122 slide through the semi-circular opening 95 in the stripper plate 51, as shown in FIG. 15 and FIG. 16.

Once the complete article 125 has been released, the stripper plate 51 retracts to its initial position. Because the tongue 87 on the first collar 72 is engaged within the groove 88 of the stripper plate 51, the first collar 72 retracts together with the stripper plate 51. With the stripper plate 51 retracted, the first mold core 65 is bare and free of any material, the second mold core 66 carries the partially-complete article 122, and the moveable mold half 33 is in a condition having symmetric structural identity to that of FIG. 10. Because the first and second mold cores 65 and 66 are identical, operation can now continue cyclically from the condition illustrated in FIG. 10 as described above, with substitutions of identical and symmetric parts as one having skill in the art will understand, to repeatedly form complete articles 125.

The present invention is described above with reference to a preferred embodiment. However, those having ordinary skill in the art will recognize that changes and modifications may be made in the described embodiment without departing from the nature and scope of the present invention. Various further changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. An injection mold assembly for manufacturing multiple-component articles comprising:
   opposed first and second mold halves;
   mold cores in a mold core assembly carried by the first mold half, each mold core carrying a collar mounted for movement in reciprocal directions between a retracted position and an extended position;
   each mold core mounted for rotation between a first position and a second position about an axis of rotation;
   the mold halves are mounted for movement in reciprocal directions along an axis of reciprocation between an open position and a closed position forming molding cavities between the mold cores and the second mold halves; and the axis of rotation of the mold cores in the mold core assembly is different from axes of rotation of mold cores in other mold core assemblies;

wherein in the second positions of the mold cores and in the open position of the first and second mold halves, the collars are free to move between the retracted and extended positions.

2. The injection mold according to claim 1, wherein the axis of reciprocation of the first and second mold halves is parallel to each of the axes of rotation of the mold cores.

3. The injection mold according to claim 1, wherein in the first positions of the mold cores and in the closed position of the first and second mold halves, the mold cores cooperate with the second mold half to define a first molding configuration.

4. The injection mold according to claim 3, wherein in the first molding configuration, first molding cavities are formed between the mold cores and the second mold half in preparation to receive material for molding.

5. The injection mold according to claim 3, wherein in the second positions of the mold cores and in the closed position of the first and second mold halves, the mold cores cooperate with the second mold half to define a second molding configuration different from the first molding configuration.

6. The injection mold according to claim 5, wherein in the second molding configuration, second molding cavities are formed between the mold cores and the second mold half in preparation to receive material for molding.

7. An injection mold assembly for manufacturing multiple-component articles comprising:

opposed first and second mold halves mounted for movement in reciprocal directions along an axis of reciprocation between an open position and a closed position;

mold cores in a mold core assembly carried by the first mold half, each mold core carrying a collar mounted for movement in reciprocal directions along the axis of reciprocation of the first and second mold halves between a retracted position and an extended position;

sets of first and second contours formed in the second mold half;

each mold core mounted for rotation between a first position and a second position about an axis of rotation;

in the first positions of the mold cores, the mold cores are registered with the first contours, and in the second positions of the mold cores, the mold cores are registered with the second contours;

in the second positions of the mold cores and in the open position of the first and second mold halves, the collars are free to move between the retracted and extended positions; and the axis of rotation of the mold cores in the mold core assembly is different from axes of rotation of mold cores in other mold core assemblies.

8. The injection mold according to claim 7, wherein in the open position of the first and second mold halves, the mold cores are free to rotate between the first and second positions.

9. The injection mold according to claim 7, wherein in the first positions of the mold cores and in the closed position of the first and second mold halves, the mold cores and the first contours cooperate to form first molding cavities in preparation to receive material for molding.

10. The injection mold according to claim 7, wherein in the second positions of the mold cores and in the closed position of the first and second mold halves, the mold cores and the second contours cooperate to form second molding cavities in preparation to receive material for molding.

11. The injection mold according to claim 7, wherein in the first positions of the mold cores, the collars are in the retracted position.

12. The injection mold according to claim 7, wherein:

drive mechanisms are formed in the first mold half; and each drive mechanism is operatively coupled to one of the mold core assemblies to impart rotation to the one of the mold core assemblies in response to activation of the drive mechanism.

13. The injection mold according to claim 12, wherein:

the mold core assemblies are arranged in clusters each bounding one of the drive mechanisms;

the one of the drive mechanisms is operatively coupled to the mold core assemblies in the respective cluster so as to impart rotation to the mold core assemblies in the respective cluster in response to activation of the one of the drive mechanisms;

each mold core assembly in the cluster includes a driven gear; and the one of the drive mechanisms in the respective cluster includes a drive gear engaged to the driven gears of each of the mold core assemblies in the respective cluster.

* * * * *